(12) United States Patent
Kundra

(10) Patent No.: US 11,961,032 B2
(45) Date of Patent: *Apr. 16, 2024

(54) SYSTEM AND METHOD FOR TAKING AN INVENTORY OF CONTAINERS FOR BEVERAGES

(71) Applicant: Nikhil Kundra, Gainesville, FL (US)

(72) Inventor: Nikhil Kundra, Gainesville, FL (US)

(*) Notice: Subject to any disclaimer, the term of this patent is extended or adjusted under 35 U.S.C. 154(b) by 70 days.

This patent is subject to a terminal disclaimer.

(21) Appl. No.: 17/171,703

(22) Filed: Feb. 9, 2021

(65) Prior Publication Data

US 2021/0182778 A1 Jun. 17, 2021

Related U.S. Application Data

(63) Continuation of application No. 16/185,950, filed on Nov. 9, 2018, now Pat. No. 10,915,858, which is a
(Continued)

(51) Int. Cl.
| | |
|---|---|
| *G06Q 10/08* | (2023.01) |
| *G06F 3/0482* | (2013.01) |
| *G06F 3/04842* | (2022.01) |
| *G06F 3/04847* | (2022.01) |
| *G06Q 10/087* | (2023.01) |
| *G06Q 20/20* | (2012.01) |
| *G06Q 50/12* | (2012.01) |
| *H04B 7/022* | (2017.01) |
| *G06F 18/00* | (2023.01) |
| *G06K 7/10* | (2006.01) |
| *G06Q 30/00* | (2023.01) |

(52) U.S. Cl.
CPC .......... *G06Q 10/08* (2013.01); *G06F 3/0482* (2013.01); *G06F 3/04842* (2013.01); *G06F 3/04847* (2013.01); *G06Q 10/087* (2013.01); *G06Q 20/20* (2013.01); *G06Q 50/12* (2013.01); *H04B 7/022* (2013.01); *G06F 18/00* (2023.01); *G06K 7/10* (2013.01); *G06Q 30/00* (2013.01)

(58) Field of Classification Search
CPC ...... G06Q 10/00; G06Q 30/00; G06Q 10/087; G06K 7/10; G06K 7/10881; G06K 9/209; G06K 9/3233
USPC ....... 705/22, 28, 34; 700/231; 235/375–385; 340/5.91, 5.92, 10.6
See application file for complete search history.

(56) References Cited

U.S. PATENT DOCUMENTS

| | | | | |
|---|---|---|---|---|
| 4,763,930 A | * | 8/1988 | Matney ..................... | G09F 3/02 40/310 |
| 4,961,533 A | * | 10/1990 | Teller ....................... | G07F 5/18 705/28 |

(Continued)

*Primary Examiner* — Olusegun Goyea
(74) *Attorney, Agent, or Firm* — Howard M. Gitten, Esq.; Lewis Brisbois Bisgaard & Smith LLP

(57) ABSTRACT

A computer based system for taking the physical inventory of liquids dispensed in full and partially full containers. A database stores images of containers and their associated volumes. The containers to be inventoried are identified by a user and input to a computer at a graphical user interface (GUI) input/output. A computer causes the display of an image of the container and a sliding level indicator at the GUI. The level indicator is slidable along the image. The computer calculates a volume of liquid remaining in the container as a function of the position of the level indicator along the image of the container.

16 Claims, 9 Drawing Sheets

Related U.S. Application Data continuation of application No. 15/398,135, filed on Jan. 4, 2017, now Pat. No. 10,127,520, which is a continuation of application No. 14/078,277, filed on Nov. 12, 2013, now Pat. No. 9,576,267.

(60) Provisional application No. 61/724,792, filed on Nov. 9, 2012.

(56) References Cited

U.S. PATENT DOCUMENTS

| | | | | |
|---|---|---|---|---|
| 5,588,963 A * | 12/1996 | Roelofs | | G01F 3/00 604/65 |
| 5,603,430 A * | 2/1997 | Loehrke | | B67D 1/1234 222/37 |
| 6,147,686 A * | 11/2000 | Brown | | G06F 3/0481 715/848 |
| 6,616,037 B2 | 9/2003 | Grimm et al. | | |
| 7,241,066 B1 * | 7/2007 | Rosen | | A46B 11/002 401/268 |
| 7,573,395 B2 * | 8/2009 | Morrison | | H04Q 9/00 340/572.1 |
| 7,584,882 B2 * | 9/2009 | Gray | | G06Q 10/0875 235/375 |
| 8,219,558 B1 * | 7/2012 | Trandal | | G06Q 50/16 707/736 |
| 2002/0029176 A1 * | 3/2002 | Carlson | | G06Q 10/087 705/28 |
| 2003/0034392 A1 * | 2/2003 | Grimm | | G06K 7/10881 235/385 |
| 2003/0177069 A1 * | 9/2003 | Joseph | | G06Q 10/087 705/22 |
| 2004/0207512 A1 * | 10/2004 | Bastian, II | | G06Q 10/087 340/10.6 |
| 2005/0075954 A1 * | 4/2005 | Matsumoto | | G06Q 10/087 705/28 |
| 2005/0140498 A1 * | 6/2005 | Bastian, II | | G06Q 10/087 340/8.1 |
| 2005/0197738 A1 * | 9/2005 | Morrison | | G01C 9/00 700/231 |
| 2006/0085308 A1 * | 4/2006 | Metzger | | G07F 7/0886 705/34 |
| 2006/0131404 A1 * | 6/2006 | Dervishian | | G06Q 99/00 235/385 |
| 2006/0161374 A1 * | 7/2006 | Hillam | | G01K 13/12 374/E1.004 |
| 2006/0238346 A1 * | 10/2006 | Teller | | G01G 23/3735 340/572.1 |
| 2006/0282342 A1 * | 12/2006 | Chapman | | G06Q 10/087 705/28 |
| 2007/0228068 A1 * | 10/2007 | Schneider | | G06Q 10/087 222/1 |
| 2008/0272923 A1 * | 11/2008 | Breed | | G06F 3/0233 340/632 |
| 2009/0134183 A1 * | 5/2009 | Odishoo | | B65D 55/0809 222/30 |
| 2010/0002834 A1 * | 1/2010 | Gudmundson | | G01V 5/0025 378/53 |
| 2010/0046791 A1 * | 2/2010 | Glickman | | H04N 7/18 705/28 |
| 2011/0153614 A1 * | 6/2011 | Solomon | | B65G 1/127 707/769 |
| 2013/0002443 A1 * | 1/2013 | Breed | | B65D 90/48 340/686.1 |
| 2013/0145324 A1 * | 6/2013 | Kelly | | G06F 1/1686 715/846 |
| 2013/0297463 A1 * | 11/2013 | Garber | | G06Q 10/087 705/28 |

* cited by examiner

SYSTEM AND METHOD FOR TAKING AN INVENTORY OF CONTAINERS FOR BEVERAGES

CROSS-REFERENCES TO RELATED APPLICATIONS

This application is a Continuation Application of U.S. patent application Ser. No. 16/185,950 filed Nov. 9, 2018, now U.S. Pat. No. 10,915,858 issued Feb. 9, 2021, which is a Continuation of U.S. application Ser. No. 15/398,135 filed Jan. 4, 2017, now U.S. Pat. No. 10,127,520 issued Nov. 3, 2018, which is a Continuation of U.S. application Ser. No. 14/078,277 filed Nov. 12, 2013, now U.S. Pat. No. 9,576,267 issued Feb. 21, 2017 which claims the benefit of and priority to U.S. Provisional Application No. 61/724,792, filed Nov. 9, 2012, the contents of which are herein incorporated.

BACKGROUND OF THE INVENTION

This invention is directed to a system and method for taking inventory, and in particular, for taking the inventory of the amount of fluid in containers on hand before or after consumption over a period of time.

The inventory and control of beverages, such as liquor, by way of example, is a pressing problem in any business that dispenses liquid, for example, on a daily basis. It is necessary for businesses such as restaurants, bars and nightclubs, to maintain a running inventory of beverages on hand.

It is estimated that establishments having inventories of beverages within containers have shrinkage rates of 23%. In other words, one in four drinks disappears as a result of spillage, evaporation or unaccounted for consumption. Shrinkage arises in part from a lack of accounting for inventory on a daily basis.

Although point of sale data can be used as an estimator of the amount of beverages consumed during business hours, it does not account for waste, spillage, free drinks or even evaporation (collectively known as shrinkage). Nor does it account for any inconsistencies in the amount of beverages consumed from order to order when liquids are free poured by a variety of employees to fulfill orders. It only provides a count of drinks ordered through this system and estimates the amount of beverages consumed based upon an idealized recipe for each sale, i.e. each order is made with exactly the same amount of liquid regardless of who prepares it. Therefore, although the point of sale count is adequate, it suffers from the shortcoming that it does not account for a significant amount of the beverage consumption and is inaccurate in its estimate, because it counts sales, not consumption.

In order to overcome this shortcoming, inventory is determined on a periodic basis through manual labor. An employee of the establishment will count the number of bottles having liquid in them, which is a function of total amounts of liquid consumed during that time period, and will estimate the amount of liquid remaining in any open containers to arrive at a new inventory. This system has been satisfactory and has continued to be used, however it suffers from the deficiency that it is labor intensive often taking hours. If it is performed during business hours, the employees performing the task may become distracted by the competing responsibilities of their job during business hours or just the general distractions of the commotion in the environment of a bar, nightclub or restaurant. Furthermore, an accurate inventory is almost impossible during business hours because containers full of beverages are continuously being consumed. If the job is delayed for after hours, then the employees are often tired and the process is prone to human error. This method is extremely inaccurate and requires the same person to do inventory every time for consistent eye-balled estimations of liquid remaining in open bottles. Lastly, because it also takes five to six man hours to complete, making it impractical to do on a daily basis leaving establishment owners and managers unsure of their inventory assets on a daily basis.

Automated inventory taking systems have been developed such as those known from U.S. Pat. No. 6,616,037 which defines a computer based system for taking physical inventory of beverages dispensed in full and partially full containers in an attempt to control theft and over-pouring. This system scans bar codes on the bottles to identify product information about the scanned bottle and provides a silhouette of a bottle to the user on a screen of a computing device. The user indicates, by touching the silhouette of the bottle on the screen, the fluid level within the bottle. They may touch the full symbol, empty symbol, some intermediate symbol to input the quantity of beverage remaining in a partially filled bottle that has been scanned. These inventories are then processed. Additionally, it requires a bar code scan for each inventoried bottle. This system has been satisfactory, however, it too is time intensive and as a result of general input icons such as full, empty, quarter or the like, or fat thumb processing by touching the screen with a user's finger misprocessing and limited accuracy as a result of the screen size and finger size of the user results, and causes confusion amongst its users.

Accordingly, a system and method which overcomes the shortcomings of the prior art to more accurately and quickly inventory partially filled containers is desired.

BRIEF SUMMARY OF THE INVENTION

A computer based system calculates the physical inventory of liquids dispensed in full and partially full containers. A database stores images of containers and their associated volumes. The containers to be inventoried are identified by a user and input to a computer at a graphical user interface (GUI) input/output. A computer causes the display of an actual image of the container and a sliding level indicator at the GUI. The level indicator is slidable along the image. The computer calculates a volume of liquid remaining in the container as a function of the position of the level indicator along the image of the container.

In a preferred embodiment, the bottle label is reproduced in the image to facilitate accurate positioning of the sliding level indicator. The user moves the sliding level indicator to a position corresponding to the level of liquid relative to the label, to provide accuracy in measurement without having to alter the bottle. The computer can also identify and calculate the liquid level in each bottle simply via photographing, video recording, or panning over the bottle(s) being measured.

BRIEF DESCRIPTION OF THE DRAWINGS

The present disclosure is better understood by reading the written description with reference to the accompanying drawing figures in which like reference numerals denote the similar structure and refer to the elements throughout, in which.

DETAILED DESCRIPTION OF THE PREFERRED EMBODIMENTS

Figure 1:
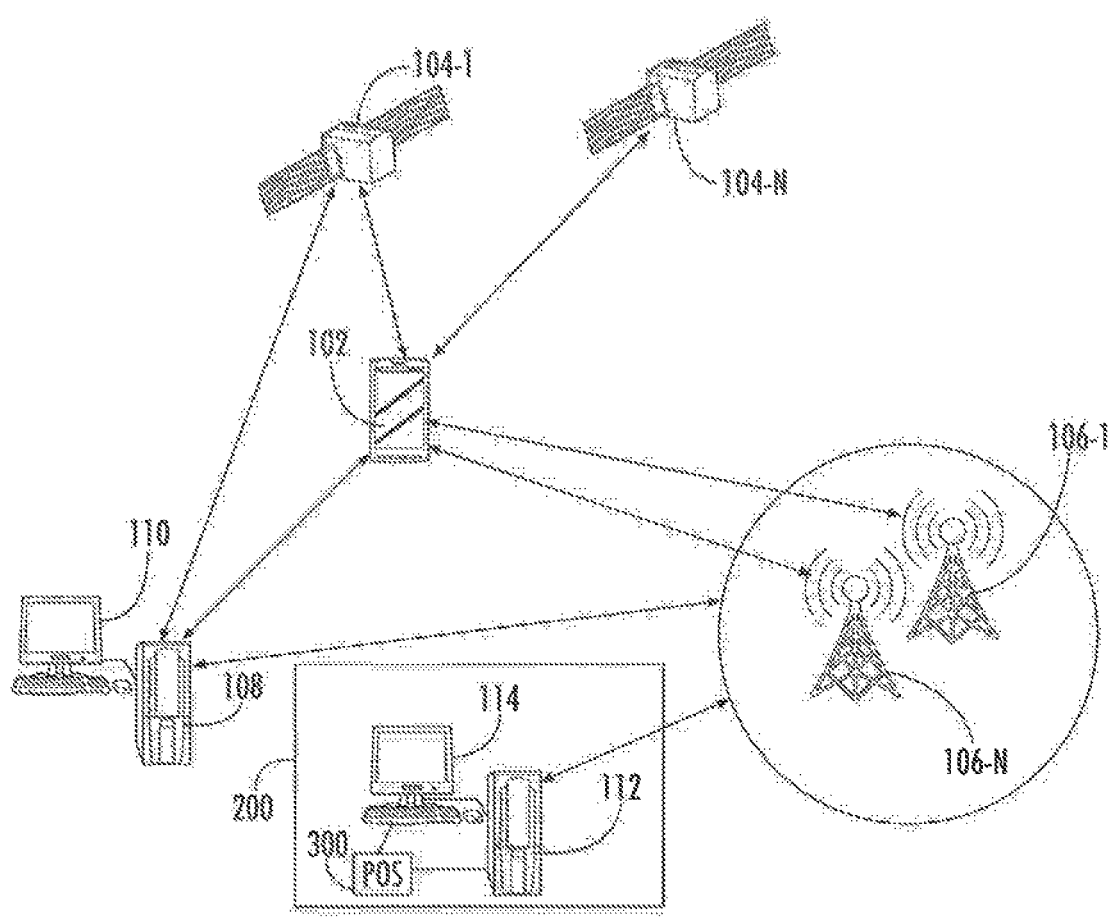
FIG. 1 is a schematic view of a system operating in accordance with the invention for taking inventory.

In order that the invention may be more readily understood, certain terms are first defined here for convenience. Listed below are definitions of various terms used to describe this invention. These definitions apply to the terms as they are used throughout the specification and claims, unless otherwise limited in specific instances, either individually or as part of large group.

"SaaS solution"="Software-as-a-service solution"

"Beverage" may represent any and all types of liquids and fluids and/or contents within any and all types of containers or items which take up a measurable volume of space in a container. For example, other uses include lemons, beer bottles, powders, tablets, and any item to be counted in whole via typing in the number or volume of such item and swiping to the next item in the inventory Item Order.

"Bottle" can be used to represent any and all "Beverage Container" types (cans, kegs, etc.)

"Beverage," "Beverage Identity," and "Attributes," refer to the specific Beverage with attributes and characteristics including but not limited to "Beverage Name" (the name of the Beverage), "Beverage Container" or "Actual Beverage Container" (the container the beverage or liquid may or may not be in), "Beverage Container Type" (the type of container the Beverage comes in, like a bottle, keg, can, etc.), "Beverage Container Size" (the size or volume size of the container, like 12 ounces, 750 mL, 1 L, 1.75 L, 23 shots, etc. This may also be the amount or size of contents within the container.), "Beverage Type" (the primary type or description of the Beverage) "Beverage Sub-type" (the secondary type and detailed description of the Beverage), "Beverage Distributor" the Distributor, shipper, and/or supplier of the Beverage) "Beverage $/Unit(s) (the dollar value of a unit of Beverage) (1) Sold to Customers (purchased by the establishment's customer) and (2) Purchased from Distributors (purchased by the Establishment from suppliers)," "Beverage Par Level" (the minimum level of Beverage needed (in any units of volume or size) by the Establishment or in the Establishment's Inventory), "Number of Beverage Name, Beverage Container Types, and other Beverage characteristics (the amount of Beverage Containers and each of their names and Beverage Identities) (1) Ordered and (2) Arrived," etc. Beverage Container's Serial Bar or Other Identifying Number (including but not limited to SKU number) and Picture of Serial Bar, Beverage Image, or Other Identifying Number may also be part of the Beverage Identity and Attributes.

"Hierarchal Level" represents the level (and associated information and data) of an Establishment: the multi-Establishment owning parent company, the Establishment, Bars within the Establishment, Sections or rows within Bars, and Beverages within Sections, Bars, Establishments, or Multiple Establishments.

"Beverage Image", "Container Image" and "Image" means an actual image of the container and may include an image, photograph, digital rendering, etc. of the Beverage and Beverage Container as it appears to the user at time of shipping by the manufacturer or as captured by the user at time of taking inventory.

"Actual Beverage Height," "Beverage Height," "Beverage Level," "Beverage Level Height," and "Height of Injected Liquid" may represent the height (and associated volume) of Beverage in the (actual, real-life) Beverage Container. "Height of Injected Liquid" is used to clarify the term during the Equation development process.

"Volume of Injected Liquid," "Amount of Beverage," and "Beverage Volume" refer to the volume of Beverage within a Beverage Container.

"Total Image Height," "Image Height," and "Beverage Image Height" are the heights and dimensions (say, in pixels) of the Beverage Image and/or between specific minimum and maximum heights and dimensions (say, in pixels) of the Beverage Image (e.g. between the specific minimum and maximum pixel heights of liquid in an image of a potentially full container).

"Slider GUI Height," "Slider Height," "Slider (GUI) Level," and "Slider (GUI) Height Level" may represent the indicated or inputted height (and associated volume) of Beverage on the Beverage Image, which may be marked by a lever or a row or colorful liquid filling to where tapped on the Image. This Slider GUI Height can be inputted via a user manually tapping and indicating where the Actual Beverage's Height is on the Beverage Image, or calculated by taking a picture of, video of, or simply panning over the Beverage(s), Beverage Container(s), Beverage Height(s) and letting the SaaS solution automatically quantifying the actual Height(s) and Volume(s) of the Beverage(s) or liquid(s) in the Container(s).

"Image Filled Ratio" represents ("Slider Height"/Total Image Height)

"Actual Filled Ratio" represents (Height of Injected Liquid or Beverage Height)/Beverage Container Height Regarding Revenues and Profits, "Theoretical" refers to the amount of revenues and profits that should have been made based on Beverages or drinks or items sold according to the Establishment's sales records (like receipts, Point-of-Sale System reports, etc.). "Actual" refers to the amount of revenues and profits that were actually made given revenues and profits collected on actual sales of "Beverages Actually Displaced/Lost/Consumed" (Beverages, drinks, or items given away—whether sold or not—from or out of the Establishment's Inventory). Any discrepancy in number, amount (in money or Beverage Volume), or value between "Actual" and "Theoretical" is known as "Shrinkage," "Shrinkage Level," "Loss due to Shrinkage," "Shrink," "Shrinkage Level," "Shrinkage Rate," or "Shrinkage Costs." Shrinkage is the loss of Inventory that was intended to be sold, but was not sold. This loss of Inventory may be due to many factors, including but not limited to drinks either given away for free, over-pouring by bartenders, Beverage Container (bottle) breakage, Beverage spills, theft, or improper accounting and lack of oversight (often, due to miscommunication) between Employees and Workers who separately handle and oversee the process of doing Inventory, the process of paying for (by the Establishment) and Ordering Beverages (from Distributors, Distillers, or suppliers), the process of tracking Shipped Beverages, and the process of confirming or accurately disconfirming Beverages Arrived at (or Delivered to) the purchasing Establishment.

("Theoretical" Revenues and Profits)−"Shrinkage"= ("Actual" Revenues and Profits).

Reference is now made to FIG. 1 in which a system and environment in which the invention operates is provided. A computing device 102, preferably a smartphone, having a graphical user interface (GUI) and a camera thereon by way of non-limiting example. Smartphone 102 can identify a geographic location as well as communicate data utilizing fixed base stations 106-1, 106-n which in turn are in communication with server 108 which can calculate a geographic location of smartphone 102 as well as store and process data downloaded at smartphone 102 as will be discussed in greater detail below. Server 108 may communicate with base stations 106-1, 106-n utilizing any suitable means such as a conventional telephone network, high speed data lines, SMS communication, or a combination of the foregoing. Server 108 can be controlled by a work station 110 or similar user interface.

Either in addition to or instead of base stations 106-1, 106-n, global positioning system (GPS) and associated processing circuitry/software may be utilized. The GPS system may be incorporated into each smartphone 102 and such system can use a plurality of GPS satellites 104-1, 104-n to independently determine the geographic location of the smartphone 102. The GPS based location information thus obtained can be forwarded to server 108 through the one or more base stations 106-1, 106-n, or as known in the art, through other communication circuits. Server 108 is an application server which processes not only location data, but, the inventory data created by smartphone 102 as will be discussed below. In a preferred but non-limiting example, an establishment 200 will include point-of-sale devices 300, such as a cash register or credit card terminal for monitoring the purchase of beverages being monitored with the present invention. Point-of-sale device 300 may include its own application server 112 for monitoring point-of-sale device 300 and determine how much of the monitored liquid has theoretically been consumed in the establishment 200.

A smartphone 102 is used by way of example. However, any computing device having a GUI and the capability to take a picture and transmit and receive data may be utilized as the inventory capture device. These devices may include tablet or even latest generation notepads or laptop computers. Furthermore, a single server 108 or 112 is shown and will do the processing as described below. However, this is to facilitate discussion and multiple servers in a cloud configuration may be utilized to execute the invention. Additionally, the invention is described as being primarily processed at servers 108 or 112. However, the calculation of change and inventory can in fact be determined locally at more powerful smart devices, such as tablets.

Figure 2:
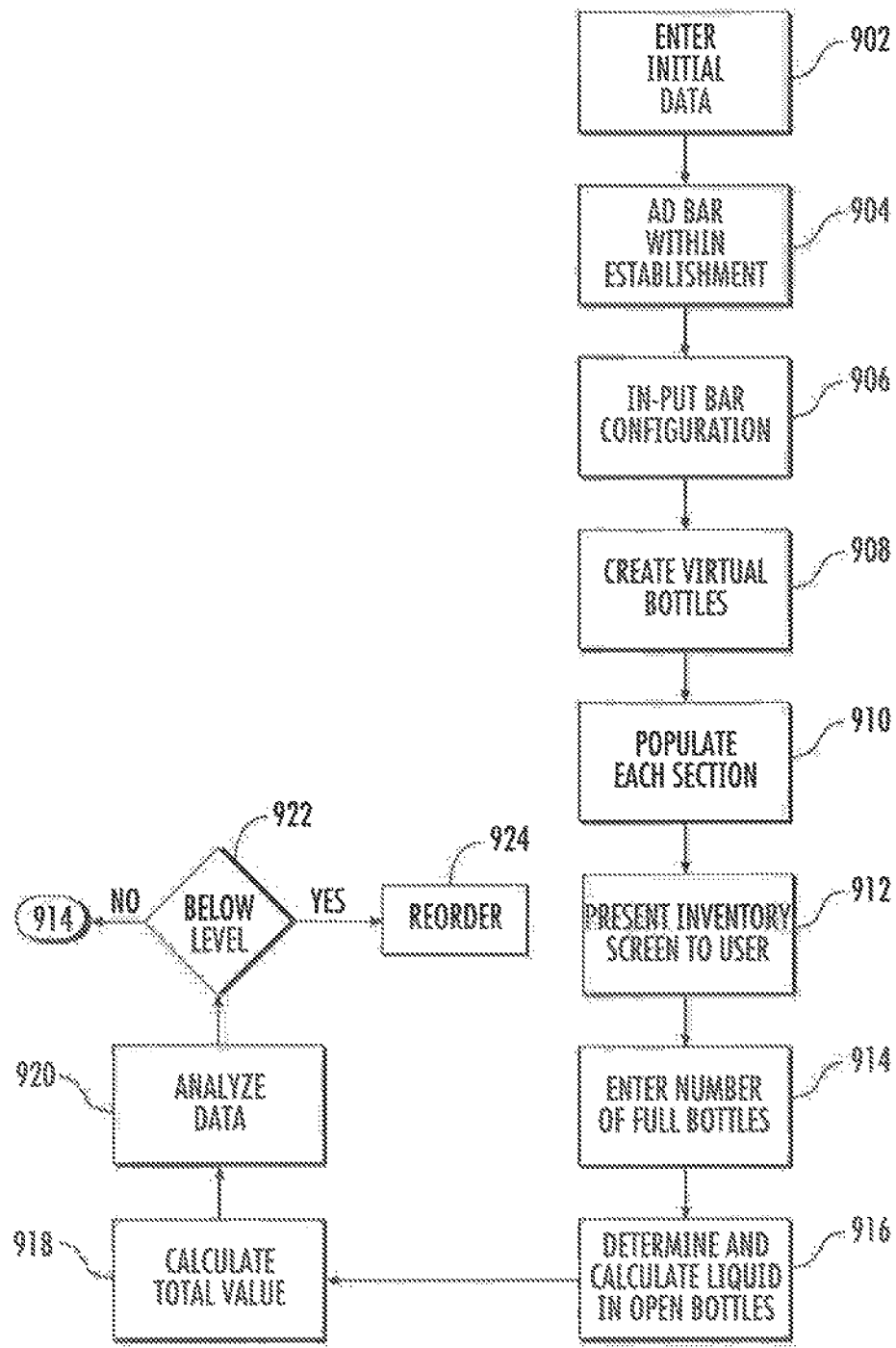
FIG. 2 is a flow chart for operating a computing device in accordance with the invention.

Reference is now made to FIG. 2 in which the process for taking the physical inventory of liquid is provided. In a step 902 initial information is input to server 108 through smartphone 102 or through a computer such as computer 10 or 114. This input data is stored in a database associated with server 108. The account information includes at least one or more of the following:

Purchaser's name
Purchaser's date of birth (including possibly for payment verification, initial SaaS solution purchase, and re-Ordering from app)
Purchaser's email address
Purchaser's phone number incl. extension
Purchaser's specific job title
Purchaser's favorite type of liquor, shirt size (for gifts)
Establishment's name and website
Establishment ID Number
Establishment Account and Customer Numbers
Additional email addresses (for Establishment, owner, and manager contact)
Purchaser's and Establishment's mailing address (incl. province, region, country, county, state, city, etc.)
Purchaser's and Establishment's billing address (incl. province, region, country, county, state, city, etc.) and payment info for this SaaS solution for payment future upgrades, new features, re-Orders from app, Shipments, etc.
Purchaser's and Establishment's credit/debit card information (Name on card, type of card, card #, security code, expiration date, billing zip code) or bank account info (checking and routing, wire numbers, with name and bank type)
Coupon code(s) for discounts or special promotions
Name of Establishment's owning company or group
Owner and manager name(s) of Establishment
Establishment's physical address (for possible geo-fencing) incl. province, region, country, county, state, city, etc.
Establishment/business type and number of Establishments interested in this SaaS solution
Associated Establishments (for possible linking of franchise, corporate, additionally-owned Establishments for reports, crowd-shipping, additional features), including addresses, business types, and the like.
Annual, monthly, or custom subscription tiers and prices as this will be factored into reports, analytics, and trend lines.

Utilizing general information about the establishment, server 108 can now track data and map that data to the establishment. However, by utilizing only GPS features as known in the art, by knowing the address of the establishment, server 108 can verify proper use of the system through geotagging the operation, i.e., confirming that the location of the operation of the smartphone 102 utilizing the system corresponds to the establishment which the smartphone 102 claims to be associated. Furthermore, by maintaining data about related establishments, i.e., a common owner such as franchisees or multiple non-franchised locations, in accordance with the inventory processing steps described below, can coordinate reordering of supply amongst all of the related establishments to take advantage of volume discounts, reduced shipping costs for a single shipment and other efficiencies and savings. Furthermore, by sharing data across related companies, and analytics for trends that are common amongst related establishments, or different, can be produced in accordance with the invention as will be described below.

For each establishment, the system accounts for the layout within the establishment such as the number of bars, the shelf space at each bar, the storage capabilities at each bar. Therefore, during a second initialization step in accordance with step 904, bars within an establishment are inventoried and identified. Each bar within an establishment will be given a name. Conventional names are "back bar", "patio bar", "main bar", "side bar", "tiki bar", and the like. The naming and assigning of individual bars within an establishment can be done either at computers 110, 114 which communicates with server 108, or utilizing smartphone 102 in a preferred but non-limiting embodiment.

Figure 3:
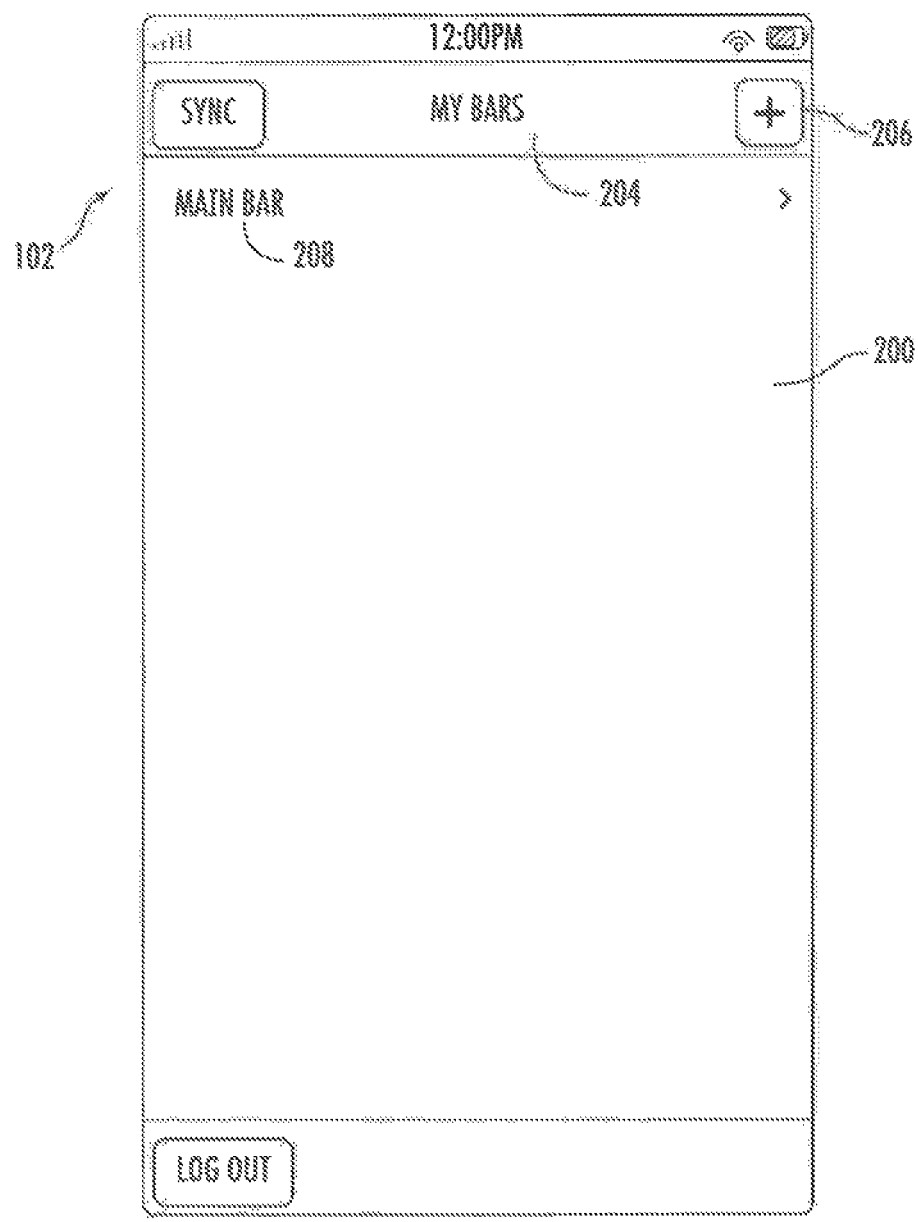
FIG. 3 is a front plan view of a computing device operating in accordance with the invention showing a screen shot for selecting a bar within an establishment for inventory in accordance with the invention.

Reference is now made to FIG. 3 in which a screen shot 200 from a smartphone 102 of a "MY BARS" page prompts the user to input each of the bars within the establishment. As seen here, an initial bar, the main bar 208 has been input. By activating the "+" icon 206, additional bars within each establishment are added. This input may be done on an adhoc basis, in other words, a user entering each bar or by uploading a machine readable preconstructed interactive upload form. A user will enter at least one or more of the following:

Establishment name
Number of Bars within Establishment
Names of Bars within Establishment
Number of Sections within each Bar
Names of Sections within each Bar
Timestamp of creation, deletion, and/or modification of any and all of these items.
Primary "Beverage Type" for each bottle (Vodka, Beer, Non-Alcoholic, etc.)
"Beverage Sub-Type" for each Beverage ("Coconut-flavored" Vodka, "Amber" Beer, "Orange Juice" Non-Alcoholic")
Distributor for each Beverage
$/Beverage Unit (like $/bottle, $/pint, or $/glass, $/shot, etc.) sold for each Beverage
$/Beverage Unit (like $/bottle, $/pint, or $/glass, $/shot, etc.) purchased by Establishment for each Beverage (for calculating Cost of Goods Sold, Profit Margins, etc.)
Liquid Level for each Beverage Container
Number and Order of Open AND Closed bottles, cans, kegs (Beverages) within the Establishment, each Bar, and each Section (for instance, two open Bacardi rums for two-handed or double-handed pours in Main Bar—Well #1)
List of Employees and Additional Workers ("Employees" and "Employee Names") in the Establishment (optional job titles included and usernames/passwords for each)
When "Shift" or "Shift Schedule" and Where "Shift Location" within the Establishment these Workers Work (e.g. Melissa works in the Main Bar, left side, on Tuesdays 12 PM-6 PM and Thursdays 6 PM-2 AM)

Figure 4:
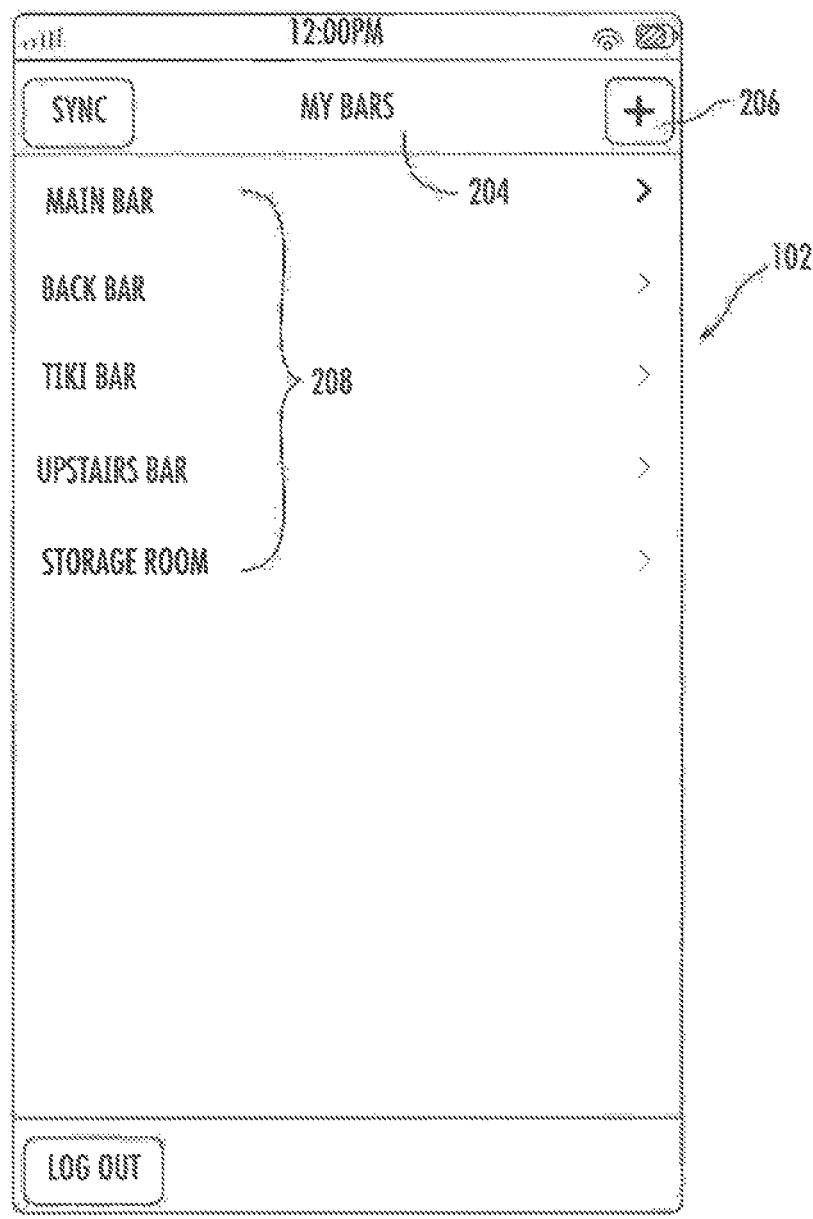
FIG. 4 is a front plan view of a computing device operating in accordance with the invention showing a screen shot for selecting a section of the bar for inventory in accordance with the invention.
Figure 5:
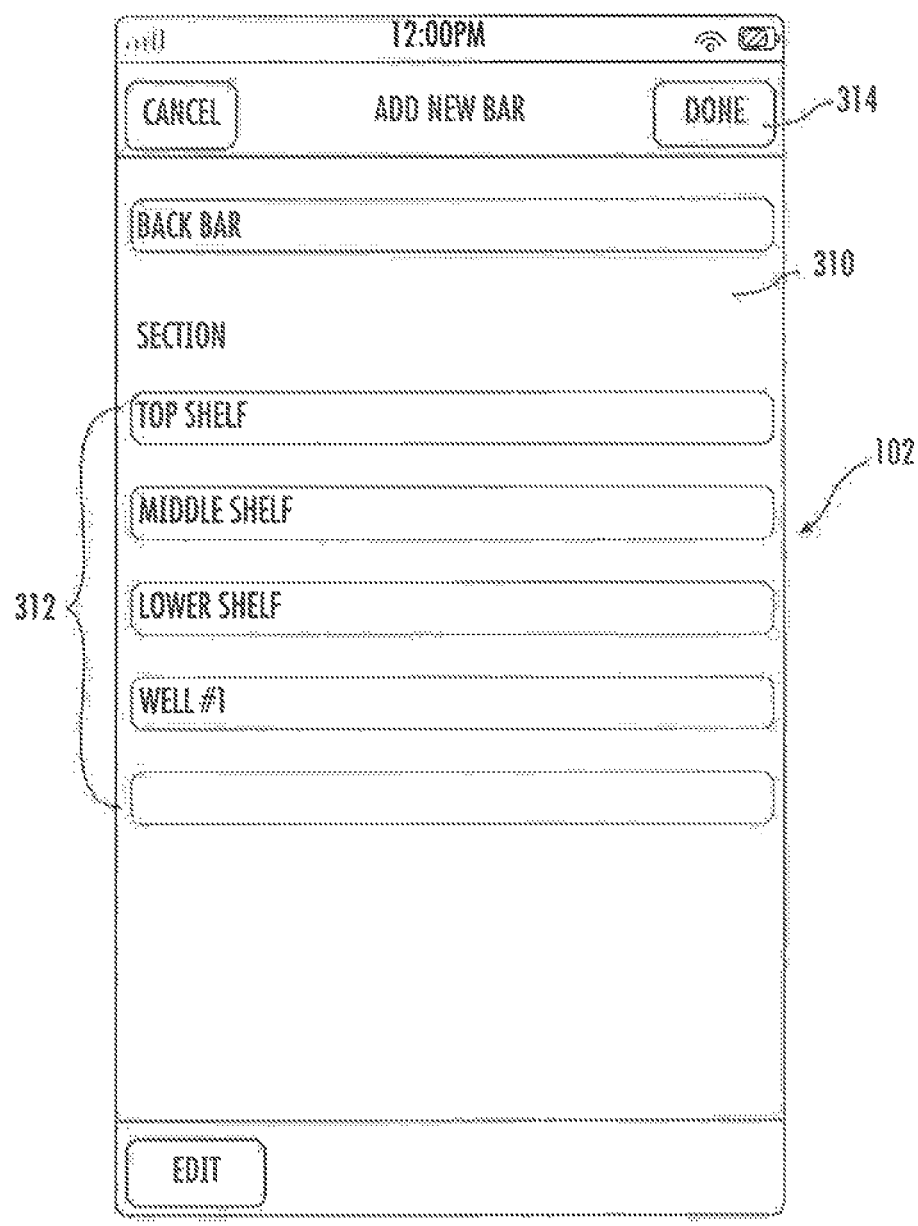
FIG. 5 is a plan view of a computing device operating in accordance with the invention showing a screen shot for adding a new bar.

As seen in FIG. 4, the user is provided with each preloaded bar. By selecting a specific bar within the establishment for set up in a step 906, a screen 300 is shown on smartphone 102 (FIG. 5). This enables storing sections and the capacity of each bar by an input to smartphone 102. So by way of example if a back bar 310 is being created, sections 312 are input such as "top shelf", "middle shelf", "lower shelf", even traditional sections such as the well which physically make up a bar. These inputs can be typed in or prompts can be provided by server 108 at smartphone 102 for selection or deselection. Once saved, by hitting the "Done" button 314, the configuration of each bar is stored at server 108.

Figure 6:
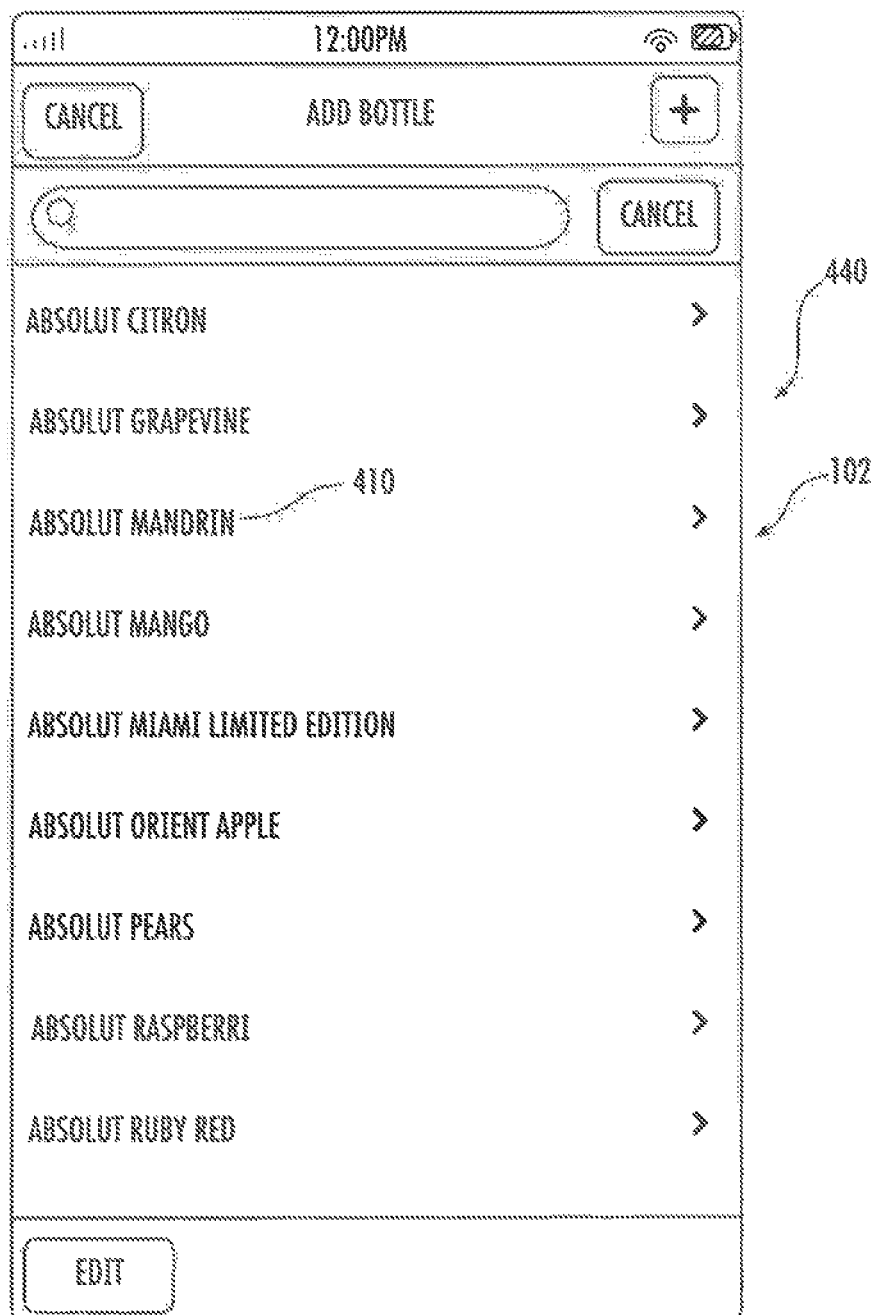
FIG. 6 is a plan view of a computing device operating in accordance with the invention showing a screen shot for adding a particular type of beverage container to a section of the bar to perform inventory.

Reference is now made to FIG. 6 in which a method for initializing a database for server 108 of containers to be operated upon by server 108 to maintain inventory calculation is provided. In a step 908, beverage containers such as bottles, preferably with the labels and caps thereon, are acquired and processed from any of a variety of sources. Images of each distinct container are created either by downloading images of well known containers from third party sources utilizing the internet, actually taking photographs of bottles that are unavailable, utilizing digitally rendered images from the distributors or manufacturers of the beverages, such as distillers, or the like. The image of the bottle includes identifying characteristics such as engravings, moldings, and the labels or other artwork as applied to the bottle. These are the actual images of the bottle as seen, and are stored with attributes of the bottles such as the maker of the bottle, the liquid contained within the bottle, the volume of the bottle, the height of the bottle, or the like.

The images are then edited by utilizing Photoshop or the like, to make the images look empty and allowing them to be virtually filled by providing a color within the bottle representing the liquid when a user indicates a level of liquid utilizing the GUI of smartphone 102, in particular the sliding GUI indicator which is moveable along the height of the image of the bottle. The bottle may be made to look filled or empty, or anywhere in between as function of portions being clear or nor clear by the GUI causing pixels to be selected to either be added or deleted depending upon whether the sliding GUI marker is being moved up from the bottom to the top of the bottle (towards the spout) indicating filling, (pixels will be added), or conversely, from the top of the bottle down, indicating consumption, (erasing of the pixels). Alternatively, the image can be transformed from color to transparent using layer masks; or, a combination of destructive and nondestructive techniques using layer masks and two images of the beverage, overlaying them and selecting that part of the image to make transparent/delete on one layer, while selecting parts of the image to keep opaque and then touched on other layers. Superimposing these layers gives the final result of an image of a bottle that appears empty but which can be filled as the slider GUI slides up (filled) or down (empty). It should be noted that for reasons discussed below, the labels or other important indicating and decorative features of the bottle are never made transparent.

The beverage images are also cropped so that there is no white or empty space below the bottom of the bottle and above the top of the bottle in the image. In this way, an entire library of interactive bottles is stored in server 108. If a bottle is uncommon or no picture is available from traditional sources, the user may photograph an empty version of the bottle with the normal markings, labels and the like, cropped so that there is no space at the bottom or the top to conform to the other photographs. This digital photograph is then stored in server 108 for operation as is described below.

As seen in FIG. 6 when either changing the make-up of the beverages within the shelf or when initializing the beverages contained within a shelf, an add a bottle screen 440 is offered to the user at smartphone 102 in a step 910. The add a bottle screen 440 provides a list of all of the bottles stored in the library at server 108 in alphabetical order in a scrollable form. By selecting the bottle to be added to the shelf, utilizing the GUI touch screen capabilities of smartphone 102, as known in the art, the selected bottle will be added to the inventory for that shelf by server 108 by assigning/mapping the bottle type to the section in the establishment. However, prior to addition, the user will be prompted to select the appropriate size of bottle, as well as the number of those specific bottles which are stored in that specific shelf. So by way of example, if a user were to select a specific bottle, Absolute Mandarin 410, then the user may be prompted with all of the known attributes (different volumes, different labels, shapes) for that bottle so a user may select the exact bottle to be added to the bar in that particular location. Because the beverages are sorted alphabetically, they can be searched by beverage name. However, because of the storing of the associated information discussed above, they may be searched by container size, beverage type (vodka, whiskey, rum, beer, wine) beverage sub-type, beverage distributor, or any other attribute associated with two or more different types of beverage containers.

Figure 7:
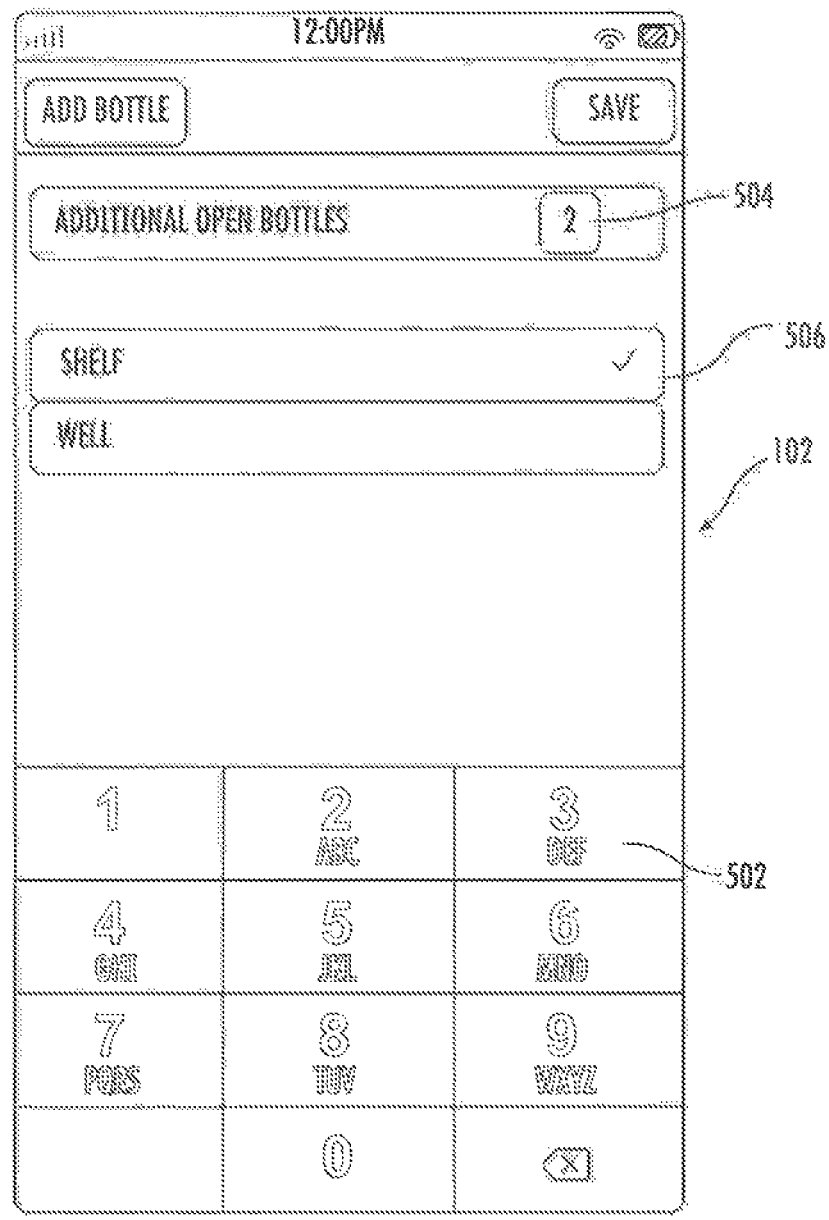
FIG. 7 is a plan view of a computing device operating in accordance with the invention, showing a screen shot for adding bottles to a particular section of the bar in accordance with the invention.

As seen in FIG. 7, once a bottle is selected to be added, the number of bottles, may be input utilizing keypad 502 to enter an amount in additional open bottle input 504. It should be noted, that bottles can be added to more than one location as shown in location input 506 by selecting or deselecting the location within the bar to which bottles are to be added. A bottle ID is mapped to a location ID as stored at server 108 in order of entry so that server 108 retains a virtual inventory of not only what containers are on hand, but how they are positioned within each section relative to each other.

Figure 8:
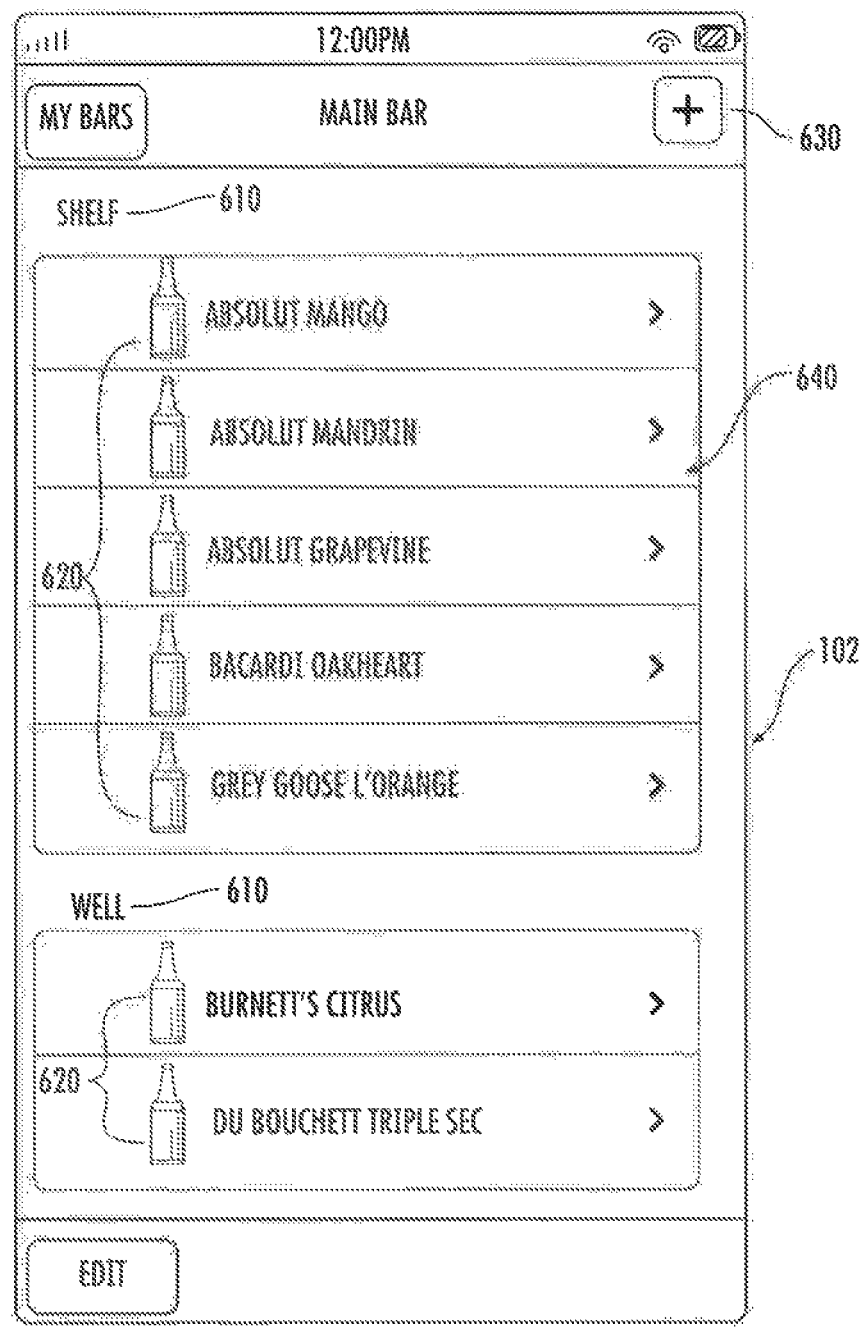
FIG. 8 is a plan view of a computing device operating in accordance with the invention, showing a screen shot indicating bottles located for taking inventory in accordance with the invention.
Figure 9:
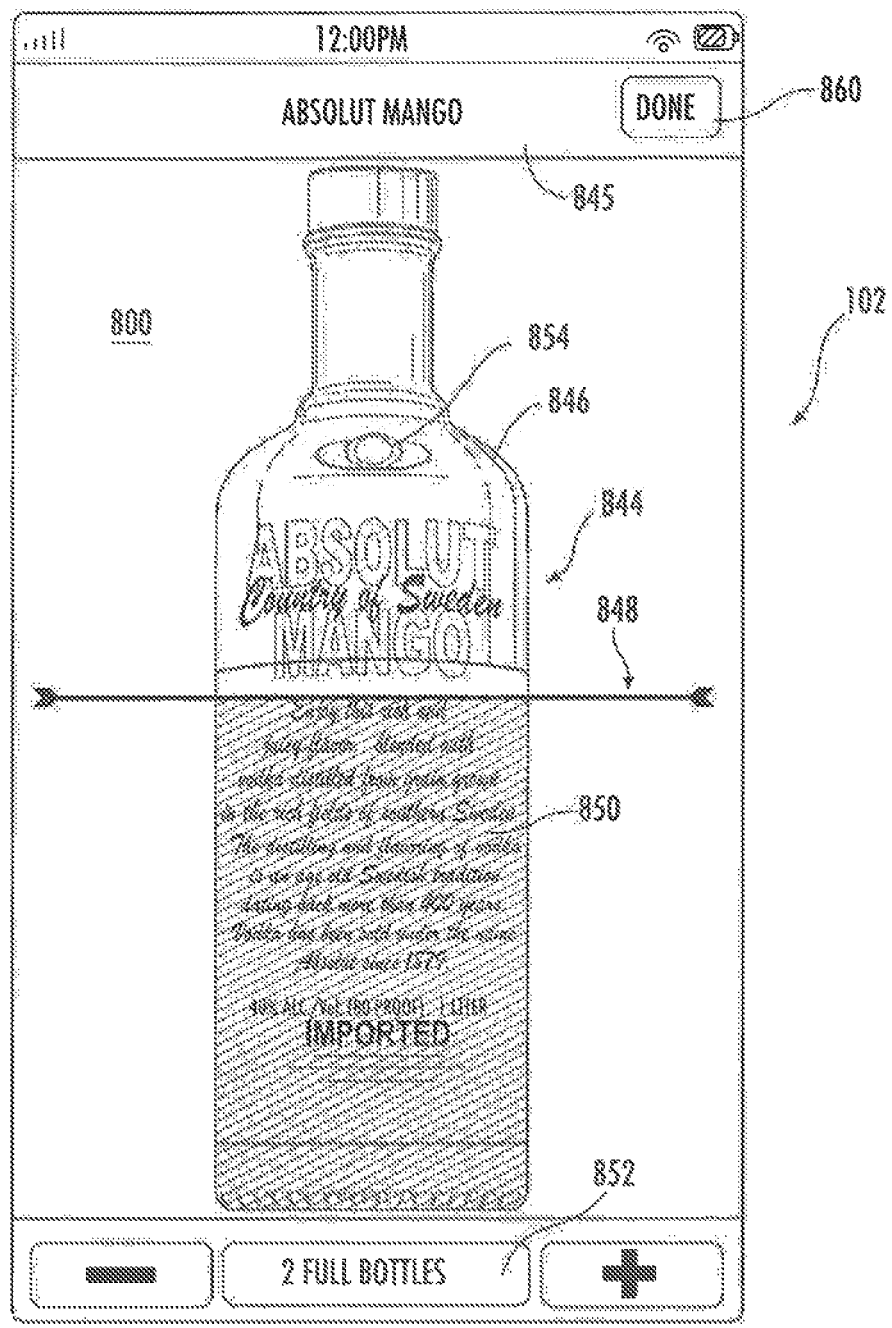
FIG. 9 is a plan view of a computing device operating in accordance with the invention, showing a screen shot for measuring liquid within an open bottle for taking inventory.

Once this process has been repeated for each location within an establishment, server 108 creates an inventory and associates the number of input bottles to each location within the establishment. Therefore, as seen in FIG. 8, when a user wishes to take inventory, the user utilizing smartphone 102 will be presented with the inventory at screen 640 for the selected location such as main bar in a step 912. Again, the beverages are provided in a scrollable list 620 for each respective section 610 within the main bar such as shelf or well in the order in which they exist at the shelf from left to right or right to left. The sections themselves are scrollable. Therefore, by selecting main bar utilizing a touch screen GUI user interface at smartphone 102, the list of beverages already identified as being in the respective locations is displayed. So if one were to select Absolute Mango by tapping the Absolute Mango item within the list of items 620, then the user is taken to a screenshot 800 in which the beverage name, in this case Absolute Mango, by way of non-limiting example is displayed in the header bar 845. Below the header bar is the beverage image 846 created as discussed above. The image includes the label 850. A sliding indicator GUI 848 is provided and is moveable by the user, as known in the art, along the height of the bottle. As discussed above, beverage image 846 is interactive so that movement of the GUI slider 848 will provide a color or shading (not clear) within the image of bottle 846 below GUI slider 848 and be clear above GUI slider 848.

In accordance with the method of the invention in a step 914, the bottles are entered into the system for inventory. The number of full bottles is entered in a precount entry 852 by use of the "+" icon to add bottles or the "−" icon to subtract bottles. Any open bottles are counted utilizing the GUI slider 848.

To calculate the volume of liquid in the open bottle in a step 916, the user moves GUI 848 to the position along the bottle 846 corresponding to the actual level of liquid remaining in the bottle on the shelf in the bar. To aid the user, GUI slider 848 causes the bottle to be filled (colored) as described above to mimic the fluid level. Furthermore, by providing the full labels on the bottle, the user may use the labels and engraved portions such as trademark stamp 854 as guideposts to more accurately determine where GUI slider 848 should be positioned. It is easier to determine whether the level of liquid is at the "A" in Absolute or the "M" of Mango or "fields" within the text of the bottle than approximating the level on a silhouette of the bottle. Furthermore, by providing a relatively thin slider bar 848, the level can be more accurately determined as compared to either a finger input or a touchpad input which suffers from inaccurate placement when the thumb covers the place to be touched, or suffers from "fat fingers" syndrome. Once GUI slider 848 is set, the "Done" icon is selected and the fluid height is captured by smartphone 102.

The user moves (slides the image) to the next beverage in the location, such as the shelf or the well, the next beverage according to the order of beverages in the beverage list as presented in FIG. 8 automatically populates the screen of smartphone 102. In this way, the user can move along the location without having to select the next bottle from a library of bottles. Or, swiping the other direction returns to the previously inventoried beverage. Upon completion of inventory, the "Done" icon 860 is selected and the recently updated inventory including the amount of liquid indicated by GUI slider 848 in the one or more bottles is either automatically sent to server 108 or may be synchronized with server 108 by selecting the sync icon at the My Bars page.

In a step 918, the beverage volume for open bottles is added to the beverage volume for full bottles to determine the total volumes at each section of the bar which is in turn the total volume for the establishment, or a group of establishments. Furthermore, the specific beverage in each section for Absolute Mango, may be added to the total volume input for other Absolute Mango for other sections.

In order to calculate a total volume, server 108 operates on the digital image GUI slider 848 and the remaining liquid indicated thereby to determine an amount of liquid remaining in the bottle and can conversely an amount of liquid consumed.

Once server 108 receives the identified bottle and the amount of liquid contained therein as indicated by the GUI slider 848, it calculates the volume. Utilizing the digital image and stored attributes of the bottle, including:

the respective height of each bottle the volume of each bottle the amount to which each bottle is filled at time of shipment thickness of the glass, in particular the thickness of the bottom which can affect the interior volume of the beverage container.

Utilizing the above information, server 108 can calculate the interior volume of the bottle and the volume of liquid contained within the bottle, including the known volume of liquid contained within the bottle at time of shipment. By determining the relative height of the GUI slider relative to the height of the bottle, server 108 calculates the ratio of the beverage (liquid) height/beverage container height which equals the actual filled ratio, i.e., the beverage height as a percentage of the beverage container height. Utilizing this information, knowing the volume of the container along the height of the container, as can be calculated utilizing complex geometric shapes to account for curvature and the like, as well as the neck, server 108 converts the actual filled ratio to the volume of liquid remaining in the bottle. Server 108 may calculate the beverage volume as a function of the height of the liquid as indicated by the digital image and the known diameter of the bottle, the container height and the actual filled ratio. In one preferred, but non-limiting embodiment, the equation is derived by using the method of least squares or any other suitable mathematical method for fitting a curve or line of best fit to a set of data. The methodology may use any type of regression analysis or other statistical methods to make this equation as accurate as possible. This equation may be any real value continuous function and may be to any degree of accuracy.

In order to provide the most accurate measurement of beverage volume, the image filled ratio, i.e., the percentage represented by the slider height divided by the total image height, must be matched to the actual filled ratio, which as described above, is the beverage height divided by the beverage container height. By way of non-limiting example, if the one liter bottle of Absolute Mango is the bottle in question as captured and discussed above, and the GUI slider height corresponds to a beverage height of 53.44234 percent of the overall image height, the actual filled ratio of that position along the actual bottles is 0.5344234. However, when accounting for the curves or neck of the bottle, this relationship can change.

In a step 918, server 108 aggregates the total volume of liquid at each section by combining a determined volume for open bottles and determine volume for full bottles at each location within an establishment. Server 108 will then time and date stamp the just input inventory and store that inventory as the inventory at that time and date. By comparing to the previous inventory, and determining a difference in liquid volumes for each type of drink at each location within the establishment, an amount consumed can be determined as a function of beverage, location within a particular bar, and even a bar within a particular establishment. Furthermore, where a single owner has more than one establishment, inventories may be aggregated to determine beverage consumption by beverage type, bar location, and establishment location across all of the establishments. It should be noted that server 108 may be synchronized each time a digital image including the GUI slider is input or each time the user changes the beverage type so that after taking inventory of each section of a bar, the data is sent to server 108 rather than waiting to sync at the very end and risking loss of any data during the intervening activities.

Often, the contents of a section of the bar changes from one inventory to another. In other words, where once Absolut was next to a bottle for Crown Royal, that same shelf may now have a bottle of Gordon's Gin between the two. Because as discussed above, the system stores the order of products within a section to facilitate inventory, when doing inventory the second time, the smartphone 102 would prompt the user from Absolut to Crown Royal, not being aware that Gordon's Gin is now present. When the user sees Gordon's Gin, they merely go back to the Absolut entry on the inventory list. Utilizing the GUI, they move the Absolut either to the right or to the left as known in the art, which will return the user to the container library, shown in FIG. 6. The user is prompted to add a bottle and then selects the newly discovered beverage and assigns the beverage to the section of the bar as discussed above in step 910.

Additionally, the above examples were presented in terms of liquids in bottles. However, the concept of taking inventory and moving along a section of an establishment is applicable for other types of establishments as well. For example, in a fruit section of a supermarket, the fruit is usually arranged in the same order along a row, such as peaches, then apples, then limes, then lemons, along a single section. In accordance with the invention, the user would identify a section within the produce section of the store, enter peaches, then apples, etc. to store the arrangement of that section within the store. At the time of inventory, the user would merely count the number of peaches and enter the number of peaches much like they enter the number of whole containers. The user would then utilize the GUI to slide the picture to the next section of fruit, apples, and count again until the row is completed. Once counting is done, the new inventory is sent to server 108 for processing. As can be seen, this system lends itself to the dairy case, the frozen food section, and the like.

As becomes readily apparent, in a step 920 server 108, analyzing the data, may produce spreadsheets or other types of reports showing total consumption of beverages from inventory to inventory, consumption of beverages on a beverage type or brand basis over time, even a determination of value of beverages in stock as a function of purchase price or sales price as known from ordering information from conventional accounting software such as Oracle or the like, and sales information as known from the POS 300. These analytics may be automatically calculated for each beverage, given its attributes, at the individual establishment, individual bars within the establishment and individual sections within the establishment. It may also automatically calculate for the beverage volume which has been sold or lost (given away for free, spilled or evaporated) during any determinable time range. Utilizing these costs and profit calculations, server 108 may automatically determine a return on investment on a beverage basis, bar basis, section basis and establishment basis. In other words, a person managing or owning an establishment may determine that vodka is more profitable than bourbon and even which brand of vodka or size of bottle of vodka is the most profitable. These analytics may also include optimizing par levels such that the computer or system automatically suggest (and change to) new par levels based on data to help optimize finances and get an establishment to Just-In-Tiume inventory.

Because the method described herein, significantly saves time, six hours for manual inventory as compared to an average of 15 minutes for taking inventory as described above, inventory can be taken more often even on a shift by shift basis which can show profitability and shrinkage trends on a per shift basis. This gives an indication of which personnel may be giving away or "losing" more beverages than another.

As seen in a step 922, because server 108 tracks inventory levels as well as consumption trends (when comparing changes in volume for each beverage from inventory to inventory) server 108 can determine when an establishment should reorder a particular beverage in a step 924. Server 108 sends and alarm to the user at smartphone 102 or either one of computers 110, 114 when a desired amount of beverage on hand falls below that necessary to meet demand for a predetermined time period. Server 108 may automatically send purchase orders, which usually follow a standard template, to suppliers for each beverage. To provide better control, the purchase orders may be sent to the manager or owner of the establishment who would then forward them on to the supplier.

By way of example, if one's minimum level for Grey Goose vodka is three bottles, and inventory indicates that only 1.36 bottles remain after an inventory session, the server 108 will prefill a Grey Goose order for an additional two bottles to maintain the level above three bottles. Furthermore, by aggregating several establishments owned by a single user, server 108, when the level of two or more establishments falls below the desired level, can aggregate the orders to receive purchase discounts.

Server 108 can track which orders have been sent, and when the shipments arrive, the user utilizing smartphone 102 can notify server 108 that the shipment has arrived. In this way, server 108 track inventory status and shipment status.

In one embodiment of the invention, drink recipes may be stored at server 108. Utilizing information from POS 300, one can determine how many of a particular mixed drink is sold. Knowing the recipe, server 108 determines how many ounces of a beverage are utilized in a particular mixed drink, and can determine the remaining number of specific mixed drinks, the current inventory can support given the recipe.

It should be known, that for ease of description only, the invention was described utilizing a single smartphone 102 and a single server 108. It should be understood, that by providing an identification number to each user making use of the system, each section of the establishment, that two or more smartphones 102 may be used in a single establishment even at the same time without having double counting, merely by comparing user IDs and section IDs. Furthermore, server 108 may be local to the establishment such as server 112, or may be multiple servers such as known from cloud based embodiments of applications.

By utilizing a smartphone, with an actual digital photograph of the bottle being inventoried, including any artwork on the bottle, and a sliding GUI indicator, a simple to use more accurate reading of inventory level in a quick manner is provided. By utilizing the artwork along the bottle, the user can use the artwork along the bottle as a guide or landmark for positioning the GUI slider along the digital image of the bottle. By utilizing an GUI interface at the smartphone, to merely swipe from bottle to bottle in the stored container library, transitioning along a shelf or other section of the bar is also expedited. By utilizing ratios of height as related to volume of a bottle, the present invention may use any screen size device such as a smartphone, tablet, or other computing device and new beverage containers may be input by the user themselves by photographing the beverage container using a calibrated screen setting. The beverage container volume equations may be determined merely from a photograph of the beverage container.

Thus, while there have been shown, described and pointed out, novel features of the present invention as applied to preferred embodiments hereof, it will be understood that various omissions, substitutions and changes in the form and detail are contemplated and may be made by those skilled in the art without departing from the spirit and scope of the invention. It is the intention therefore, to be limited on as indicated by the scope of the claims appended hereto. It is also to be understood that the following claims are intended to cover all of the generic and specific features of the invention herein described and all statements of the scope of the invention which as a matter of language might be said to fall therebetween.

What is claimed as new and desired to be protected by Letters Patent of the United States is:

1. A method for taking an inventory of containers for beverage comprising the steps of:
   providing a portable computing device having a graphical user interface;
   providing a digital image of a container corresponding to an open container at the graphical user interface, the digital image including an identification characteristic;
   providing a position indicator at the graphical user interface indicating a level by covering at least a part of the digital image;
   contacting the digital image at a position, relative to the identification characteristic, along the digital image of the open container corresponding to an amount of beverage remaining in an actual container to be inventoried causing the position indicator to indicate at the graphical user interface an amount of beverage remaining; and
   determining a volume of remaining beverage in the open container as a function of the position of the position indicator along the digital image.

2. The method of claim 1, wherein the identifying characteristic of the digital image includes a label associated with the open container.

3. The method of claim 1, further providing a server, the portable computing device transmitting at least the graphical user interface position of the position indicator to the server, the server determining the volume of beverage remaining in the open container.

4. The method of claim 3, wherein the server aggregates the volume of beverage remaining in the open container with a volume of beverage in a number of filled containers to determine a total beverage inventory.

5. The method of claim 1, wherein an establishment to be inventoried is comprised of sections, each section having at least one or more subsections, and the method further comprising the step of:
   inputting each section within an establishment into the portable computing device;
   inputting each sub-section of each section into the portable computing device; and
   inputting each container of beverage located in each sub-section of each section into the portable computing device and storing a respective location of each container as a function of the section, the sub-section, and the establishment.

6. The method of claim 5, further comprising the step of providing a server, the server storing a library of digital images of two or more containers for beverage; forwarding a list of the digital images to the portable computing device, and selecting a digital image to be associated with a section by selecting the digital image from the list at the portable computing device.

7. The method of claim 1, further comprising the step of providing a second portable computing device having a graphical user interface and a second user providing a portable computing device having a graphical user interface;
   providing a digital image of a second container corresponding to a second open container at the graphical user interface of the second portable computing device, the digital image including an identifying characteristic;
   providing a position indicator at the graphical user interface of the second portable computing device;
   contacting the digital image of the second portable computing device at a position along the digital image of the open container corresponding to an amount of beverage remaining in an actual container to be inventoried causing the position indicator to cover the portion of the digital image corresponding to an amount of beverage remaining; and
   determining a volume of remaining beverage in the open container as a function of the position of the position indicator along the digital image of the second portable computing device.

8. The method of claim 7, further comprising the step of aggregating the volume of remaining beverage in the open container with the second volume of remaining beverage in the second open container.

9. The method of claim 1, further comprising a server in communication with the portable computing device and the server aggregating the number of filled containers and the volume of remaining beverage in the open container to determine a total volume, determining whether the total volume exceeds a predetermined level, and outputting an alert if the total volume does not exceed the predetermined value.

10. The method of claim 1, further comprising a server in communication with the portable computing device and the server aggregating the number of filled containers and the volume of remaining beverage in the open container to determine a total volume, determining whether the total volume exceeds a predetermined level, and outputting an alert if the total volume exceeds the predetermined value.

11. The method of claim 5, further comprising the step of associating each digital image of the list with a container corresponding to the digital image, the container being associated with a section.

12. The method of claim 1 further comprising the step of:
determining an amount consumed as a function of the position of the position indicator along the digital image; and
receiving an input as a function of beverage purchases made to determine an amount of goods sold and comparing the amount of goods sold to the amount consumed for a container of each beverage for which a volume of remaining beverage has been determined.

13. The method of claim 12, wherein the input is from a point of sale device.

14. The method of claim 11, further comprising:
creating a library of the digital images of the containers, the library being organized to assign each image of the library of images to a designated location within the establishment; the digital image of a container to be inventoried being selectively displayed at the graphical user interface in an order corresponding to the designated location within the establishment, receiving at graphical user interface a number of actual containers counted; and the graphical user interface enabling the user to select a next container in a section of the establishment to be inventoried by causing the graphical user interface to present the images in an order corresponding to locations of the containers within a subsection of the establishment.

15. The method of claim 14, further comprising capturing the digital image of the container with a camera and inputting the digital image to the portable computing device to create the library of digital images by storing the digital image.

16. The method of claim 15, further comprising utilizing the camera to capture the digital image by at least one of taking a picture of the container, a video of the container and panning over the container.

* * * * *